Oct. 17, 1950  F. H. KOCAREK  2,526,031
FISHING PLUG RETRIEVER
Filed Aug. 28, 1946

INVENTOR.
FRANKLIN H. KOCAREK
BY
ATTYS.

Patented Oct. 17, 1950

2,526,031

UNITED STATES PATENT OFFICE 2,526,031

FISHING PLUG RETRIEVER

Franklin H. Kocarek, Chicago, Ill., assignor to Peerless Tool & Engineering Company, Chicago, Ill., a corporation of Illinois Application August 28, 1946, Serial No. 693,512

2 Claims. (Cl. 43—17.2)

This invention relates to a new and improved fishing plug retriever or the like and more especially a device adapted to be used by fishermen for releasing a fishing plug, hook assembly, or lure which has become caught or snagged under water at too great a depth to be reached by hand.

Where a fishing plug, hook assembly, or lure becomes snagged or caught under water upon an object from which it is inconvenient to release the same manually due to excessive depths or other circumstances or conditions, it is usually possible to free the hook or hooks of the fishing device from the retaining object if the fishing device can be backed-up, that is forced in the opposite direction from which it was moving at the time it became snagged or hooked onto the object.

According to the present invention, this backing-up or forcing of the fishing device in reverse is accomplished by driving a guided weight thereagainst, if necessary with substantial impact to release the caught hook or hooks, the releasing weight thus causing the fishing device to sink away and clear of the obstruction or object upon which it had become caught.

Prior attempts to provide a retriever of the kind to which the present invention relates have been more or less unsuccessful primarily because of problems encountered in guiding the retriever to the fishing device to be released. The logical and most convenient guiding means is, of course, the fishing line attached to the fishing device. However, the retriever must, to be practical, be so constructed that it can be applied to the fishing line for guidance thereby without removing the fishing line from the reel or fishing rod. Then when the retriever is on the line it must be retained thereon in a manner to permit free movement along the line, while the retention must nevertheless be such as to avoid the retriever falling off or the line escaping therefrom. Much endeavor has been directed in prior retrievers to accomplish these purposes by various complex arrangements of parts, and no really successful, simple, efficient retriever has been offered.

An important object of the present invention is to provide a fishing plug retriever or the like which is simple as to form and therefore adapted to be manufactured at low cost but which is nevertheless highly efficient in use and adapted to be guided by the fishing line attached to the plug or the like to be retrieved, the body of the retriever being slotted in a unique manner which is for all practical purposes proof against the retriever leaving the line until the line is wilfully disengaged from the retriever.

Another object of the invention is to provide a retriever of the type indicated which is all formed in one integral piece and is adapted to be attached to a fishing line serving as a guide therefore to the fishing device to be retrieved, application of the retriever to the fishing line being accomplished by a simple manual effort, without the use of tools or any movable or auxiliary element to prevent escape of the line from the retriever or dropping of the retriever from the line while the retriever is being guided to the fishing device to be retrieved.

A further object of the invention is to provide a novel fishing plug retriever or the like characterized by an especially advantageous distribution of mass and improved suspension for efficiency in operation of the retriever as well as to implement the retriever against accidentally escaping from the guiding fish line.

Still another object of the invention is to provide in a fishing plug retriever or the like improved means for facilitating application thereof to a fishing line and especially adapted to prevent accidental escape of the retriever from the fishing line.

Other objects, features, and advantages of the present invention will become readily apparent from the following detailed description of a preferred embodiment thereof, taken together with the accompanying one sheet of drawings, in which.

Figure 1:
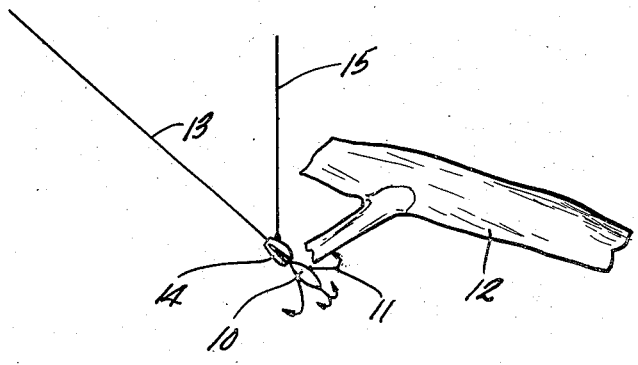
Figure 1 is a more or less schematic view showing the use of a fishing plug retriever or the like embodying the features of the present invention.
Figure 2:
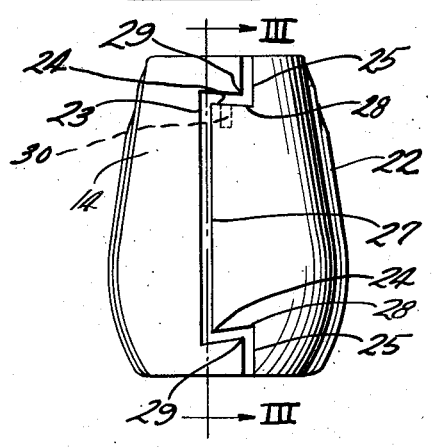
Figure 2 is a side elevational view of the retriever on an enlarged scale.
Figure 3:
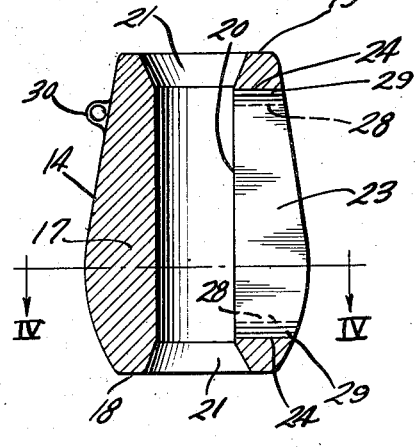
Figure 3 is a vertical sectional view through the retriever taken substantially on the line III—III of Figure 2.

In fishing with a plug or lure 10 or other hook carrying device or assembly, one or more of its hooks 11 may, and frequently will, become caught upon an underwater snag or object such as a log 12 or the like. Pulling upon a fish line 13 to which a plug 10 is attached only serves to set the caught hook 11 more tightly. However, if the plug 10 can be backed up or pushed in a reverse direction, such direction usually from the very nature of the movement of such a plug through the water being generally downwardly, the plug can usually be relatively easily released.

A convenient and effective way of driving the plug 10 backward out of this snagged or hooked position is by means of a weighted retriever 14 guided to the plug 10 as by sliding it down along the fish line 13, the weight of the retriever itself oftentimes being enough to carry the plug downwardly away from its hook position. If that is not sufficient then such weight may be multiplied by permitting the retriever to drop rapidly against the plug so as to strike the plug with a substantial impact. Sometimes it may be necessary to repeat the retriever impact several times until the caught hook has been dislodged. For this purpose, a control line 15 is preferably attached to the retriever 14.

In a preferred form, the retriever 14 comprises a substantially elongated tubular weight of substantially tear drop shape which may conveniently be formed as a one piece metallic casting from a relatively heavy metal such as zinc, lead, or suitable alloys thereof. Accordingly, the retriever body is formed with the principal mass thereof concentrated as indicated at 17 adjacent its lower striking or impact, plug-engaging end 18.

Preferably the striking or impact end 18 and an upper end face 19 on the retriever is preferably formed relatively blunt as shown and an axial, preferably cylindrical bore 20 extends therethrough. The bore 20 has its opposite ends formed in flaring or bell-mouth shape as indicated at 21 which backs off the edges about the mouths of the bore so as to relieve the fish line 13 from excessive wear, and also to implement the general streamlining of the retriever which avoids surfaces that might become entangled in weeds or other objects in the water. The general tear-drop shape of the retriever 14, as will be appreciated offers a minimum of resistance to the water and to any weeds or floating debris that may be present in the water. If desired, of course, the outer side of the retriever may be attractively ornamented as indicated, for example, at 22.

A very important aspect of the retriever 14 resides in the improved expedient for engaging it upon the fish line 13 and for retaining it on the fish line against accidental escape therefrom. To this end, the retriever is provided with a fish line entry slot 23 which is continuous from the outer surface into the bore 20 and extends sinuously throughout the length of the retriever so that the retriever can be applied to the fish line by a simple generally sidewise assembly movement and once the fish line is fully within the bore 20 it cannot accidentally escape therefrom. To the accomplishment of these desirable ends, each end portion of the slot 23 is formed with an angular leg 24 which is somewhat toed-in and meets a longitudinally extending continuation leg 25 extending outwardly and opening through the respective adjacent ends of the retriever body. Thus, the angular legs 24 and 25 meet in substantially dog-leg fashion.

This provides, in effect, a dovetail line lock 27 affording angular reentrant line restraining notches 28 at the convergences of the slot legs 24 and 25. Shoulders 29 opposing the notches 28 cooperate therewith in retaining the fish line against leaving the slot.

Figure 4:
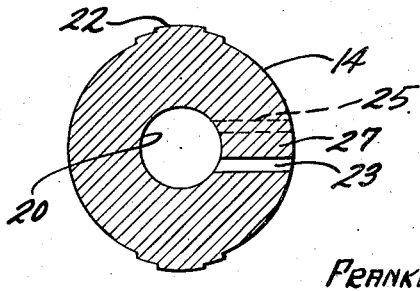
Figure 4 is a transverse sectional view through the retriever taken substantially on the line IV—IV of Figure 3.

Further implementing the locking of the fish line against leaving the slot 23 is the curvature of the inside of the line lock dovetail 27 and the shoulder portions 29 at the wall of the bore 20 (Figure 4) tending to restrain the line from escaping the notches 28 should the retriever perchance swing around on the line so that a portion of the line may escape into the entry legs 25 of the slot.

Further implementing the retention of the retriever 14 on the fish line 13 is the placement of a control line eye 30 which is preferably formed integrally with the body of the retriever 14 at a point diametrically opposite the general median plane of the slot 23, that is symmetrically on a diameter midway between the longitudinal plane of the main portion of the slot 23 and the entry legs 25 thereof. Furthermore, the eye 30 is located above the principal mass 17 of the retriever and adjacent to but spaced downwardly from the upper end 19 of the retriever. Thereby, the retriever when suspended by the control line 15 will assume an oblique position substantially as shown in Figure 1 generally on an axis parallel to or coaxial with the usual oblique direction of the fish line down which the retriever is guided toward the plug 10. Moreover, in this manner the natural hanging position of the retriever is such that the line slot 23 is on the lower side of the retriever and the retriever in sliding up and down the line is in engagement with the fish line at the opposite side of the bore 20 from the slot 23. However, should the retriever 14 swing about its axis on the fish line 13 it will nevertheless be retained against accidental escape therefrom due to the novel structure of the line slot 23 and the line lock structure as described.

From the foregoing it will be apparent that although the retriever 14 is of a simple and preferably one-piece construction and is formed with the continuously open slot 23 for receiving the fish line 13, so that it can be quickly and easily applied to the fish line by maneuvering the line through the slot 23, the fish line cannot leave the retriever nor the retriever fall off of the fish line accidentally, since a manual maneuver of the fish line past the line lock 27 is necessary in order to disengage the retriever from the line.

In the use of the retriever, it can therefore be readily applied to the fish line without removing the fish line from the reel or fishing rod and then the retriever is guided down the fish line to the plug 10 to be released, the retriever sliding down the fish line and striking the plug with such impact as is permitted through the control line 15 attached to the retriever. That is, the rate of acceleration and thereby the effective impact of the retriever may be controlled. If the first impact of the retriever 14 against the plug 10 is not sufficient, the retriever can be pulled up along the fish line 13 by means of the control line 15 and then released for further impact against the plug until the plug has been dislodged and is carried positively downwardly away from the obstruction 12 by the weight of the retriever. This is especially desirable where the plug 10 is of a floating type. After having released the plug, the retriever can be quickly separated from the fish line by manipulating the fish line out through the line slot 23.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fishing plug retriever or the like comprising an integral tubular body having a sinuous slot extending throughout the length thereof for entry into the hollow interior of the body of a fishing line attached to a plug or the like to be retrieved and serving to guide the body to the plug, said slot having an intermediate longitudinal portion and longitudinal end portions offset from said intermediate portion, and transverse slots extending at acute angles from each end of the intermediate slot portion and connecting the inner ends of the end slot portions to said intermediate slot portion whereby to provide line locks preventing accidental escape of the fish line from within the tubular body.

2. A fishing plug retriever or the like comprising a tubular body provided with a fish line bore therethrough, said body having a sinuous slot extending throughout its length and opening into the bore in the body, said slot having angularly disposed portions adjacent to the opposite ends thereof forming a dovetail line lock preventing accidental escape of a fish line from the retriever after the fish line has been inserted into the bore of the body through said slot.

FRANKLIN H. KOCAREK.

REFERENCES CITED

The following references are of record in the file of this patent:

UNITED STATES PATENTS

| Number | Name | Date |
| --- | --- | --- |
| 231,417 | Foote | Aug. 24, 1880 |
| 565,030 | Quinan | Aug. 4, 1896 |
| 720,136 | Halliran | Feb. 10, 1903 |
| 1,766,532 | Pflueger | June 24, 1930 |
| 2,097,536 | Shirk | Nov. 2, 1937 |
| 2,488,996 | Thompson | Nov. 22, 1949 |

FOREIGN PATENTS

| Number | Country | Date |
| --- | --- | --- |
| 11,160 | Australia | 1933 |